US009594488B2

(12) United States Patent
Deselaers et al.

(10) Patent No.: US 9,594,488 B2
(45) Date of Patent: Mar. 14, 2017

(54) INTERACTIVE DISPLAY OF HIGH DYNAMIC RANGE IMAGES

(71) Applicant: Google Inc., Mountain View, CA (US)

(72) Inventors: Thomas Deselaers, Zurich (CH); Daniel Martin Keysers, Stallikon (CH)

(73) Assignee: Google Inc., Mountain View, CA (US)

( * ) Notice: Subject to any disclaimer, the term of this patent is extended or adjusted under 35 U.S.C. 154(b) by 491 days.

(21) Appl. No.: 14/104,665

(22) Filed: Dec. 12, 2013

(65) Prior Publication Data

US 2015/0169204 A1 Jun. 18, 2015

(51) Int. Cl.
*G06F 3/048* (2013.01)
*G06F 3/0484* (2013.01)
*G06F 3/01* (2006.01)
*G06F 3/0482* (2013.01)
*G06T 1/00* (2006.01)

(52) U.S. Cl.
CPC .......... *G06F 3/04845* (2013.01); *G06F 3/013* (2013.01); *G06F 3/0482* (2013.01); *G06T 1/00* (2013.01)

(58) Field of Classification Search
CPC ... G06F 3/0481; G06F 3/04817; G06F 3/0482
USPC ......................................................... 715/835
See application file for complete search history.

(56) References Cited

U.S. PATENT DOCUMENTS

| 5,220,361 | A  | * | 6/1993  | Lehmer  | ................ | A61B 3/113 |
|           |    |   |         |         |                  | 351/210    |
| 7,492,375 | B2 | * | 2/2009  | Toyama  | ................ | G06T 5/007 |
|           |    |   |         |         |                  | 345/605    |
| 8,194,153 | B2 |   | 6/2012  | Asoma   |                  |            |
| 8,289,433 | B2 |   | 10/2012 | Hara et al. |              |            |
| 8,433,150 | B2 | * | 4/2013  | Yuan    | ................ | G06T 5/007 |
|           |    |   |         |         |                  | 345/629    |
| 8,606,009 | B2 | * | 12/2013 | Sun     | ................ | G06T 5/50  |
|           |    |   |         |         |                  | 345/589    |
| 8,723,978 | B2 | * | 5/2014  | Kwon    | ................ | H04N 5/23232 |
|           |    |   |         |         |                  | 348/222.1  |
| 9,230,312 | B2 | * | 1/2016  | Paris   | ................ | G06T 5/009 |
| 9,476,606 | B2 | * | 10/2016 | Fadell  | ................ | F24F 11/0009 |
| 2003/0103670 | A1 |   | 6/2003 | Schoelkopf |           |            |
| 2005/0104900 | A1 |   | 5/2005 | Toyama |                  |            |
| 2011/0273466 | A1 |   | 11/2011 | Imai   |                  |            |

(Continued)

OTHER PUBLICATIONS

European Patent Office (ISA); International Search Report and Written Opinion for PCT/US2014/068827; Mar. 2, 2015; 11 pages.

(Continued)

*Primary Examiner* — David Phantana Angkool
(74) *Attorney, Agent, or Firm* — IP Spring (57) ABSTRACT

Implementations generally relate to providing an interactive display of high dynamic range images. In some implementations, a method includes receiving a plurality of images of a scene, where the images are captured at different exposure levels. The method further includes generating a high dynamic range image of the scene based on brightness level information associated with each portion of the scene. The method further includes providing a user interface that displays the high dynamic range image. The method further includes adjusting a brightness level of at least one portion of the high dynamic range image based on user interaction with the user interface.

20 Claims, 5 Drawing Sheets

(56) References Cited

U.S. PATENT DOCUMENTS

2013/0136418 A1    5/2013  Saito
2014/0232638 A1*  8/2014  Choi ........................ G06F 3/013
                                            345/156
2016/0313842 A1*  10/2016  Pacheco ................. G06F 3/0416
2016/0313866 A1*  10/2016  Pacheco ................. G06F 3/0425
2016/0313890 A1*  10/2016  Walline ............... G06F 3/04845
2016/0314727 A1*  10/2016  Bui ......................... G09G 3/002

OTHER PUBLICATIONS

International Bureau of WIPO, International Preliminary Report on Patentability for International Patent Application No. PCT/US2014/068827, Jun. 14, 2016, 8 pages.

\* cited by examiner

INTERACTIVE DISPLAY OF HIGH DYNAMIC RANGE IMAGES

BACKGROUND

The popularity and convenience of digital cameras as well as the widespread of use of Internet communications have caused user-produced images such as photographs to become ubiquitous. Image editing systems for various consumer electronic devices and personal computers enable a user to manipulate images. One technique for manipulating images is referred to as high dynamic range (HDR) imaging, which produces a greater dynamic range of luminosity than is possible using standard digital imaging or photographic techniques.

SUMMARY

Implementations generally relate to providing an interactive display of high dynamic range images. In some implementations, a method includes receiving a plurality of images of a scene, where the images are captured at different exposure levels. The method further includes generating a high dynamic range image of the scene based on brightness level information associated with each portion of the scene. The method further includes providing a user interface that displays the high dynamic range image. The method further includes adjusting a brightness level of at least one portion of the high dynamic range image based on user interaction with the user interface.

With further regard to the method, in some implementations, the high dynamic range image is stored with full color information and information about a best brightness adjustment to use for each region of the high dynamic range image. In some implementations, the user interaction includes a user gazing at the at least one portion of the high dynamic range image. In some implementations, the user interaction includes a user selection. In some implementations, the user interaction includes a user selection, where the user selection is based on a user clicking on the at least one portion of the high dynamic range image. In some implementations, the user interaction includes a user selection, where the user selection is based on a user touching the at least one portion of the high dynamic range image. In some implementations, the adjusting is performed in real-time as the user interacts with the user interface. In some implementations, the images are captured with different focal settings such that both the brightness level information and focus settings are adjusted in real time as the user is viewing the high dynamic range image.

In some implementations, a method includes receiving a plurality of images of a scene, where the images are captured at different exposure levels. The method further includes generating a high dynamic range image of the scene based on brightness level information associated with each portion of the scene. The method further includes providing a user interface that displays the high dynamic range image. The method further includes adjusting a brightness level of at least one portion of the high dynamic range image based on user interaction with the user interface, and where the adjusting is performed in real-time as the user interacts with the user interface.

With further regard to the method, in some implementations, the high dynamic range image is stored with full color information and information about a best brightness adjustment to use for each region of the high dynamic range image. In some implementations, the user interaction includes a user selection, where the user interaction includes a user gazing at the at least one portion of the high dynamic range image. In some implementations, the user interaction includes a user selection, where the user selection is based on a user clicking on the at least one portion of the high dynamic range image. In some implementations, the user interaction includes a user selection, where the user selection is based on a user touching the at least one portion of the high dynamic range image.

In some implementations, a system includes one or more processors, and logic encoded in one or more tangible media for execution by the one or more processors. When executed, the logic is operable to perform operations including: receiving a plurality of images of a scene, where the images are captured at different exposure levels; generating a high dynamic range image of the scene based on brightness level information associated with each portion of the scene; providing a user interface that displays the high dynamic range image; and adjusting a brightness level of at least one portion of the high dynamic range image based on user interaction with the user interface.

With further regard to the system, in some implementations, the high dynamic range image is stored with full color information and information about a best brightness adjustment to use for each region of the high dynamic range image. In some implementations, the user interaction includes a user gazing at the at least one portion of the high dynamic range image. In some implementations, the user interaction includes a user selection. In some implementations, the user interaction includes a user selection, where the user selection is based on a user clicking on the at least one portion of the high dynamic range image. In some implementations, the user interaction includes a user selection, where the user selection is based on a user touching the at least one portion of the high dynamic range image. In some implementations, the adjusting is performed in real-time as the user interacts with the user interface.

DETAILED DESCRIPTION

Implementations described herein provide an interactive display of high dynamic range images. In various implementations, a system provides information-dense images such as high dynamic range images and dynamically adjusts the images based on user interaction (e.g., user attention).

In various implementations, the system receives images of a scene, where the images are captured at different exposure levels. The system then generates a high dynamic range image of the scene based on brightness level information associated with each portion of the image. The system then provides a user interface that displays the high dynamic range image. The system then adjusts the brightness of at least one portion of the high dynamic range image based on user interaction with the user interface.

In some implementations, the user interaction includes a user gazing at at least one portion of the high dynamic range image. Other forms of user interaction are possible. In some implementations, the user interaction may involve a user selection. For example, the user selection may be based on a user clicking on at least one portion of the high dynamic range image. In another example implementation, the user interaction may be based on at least one portion of the high dynamic range image. Implementations enable users with little or no knowledge and/or skills in image editing to modify images.

Figure 1:
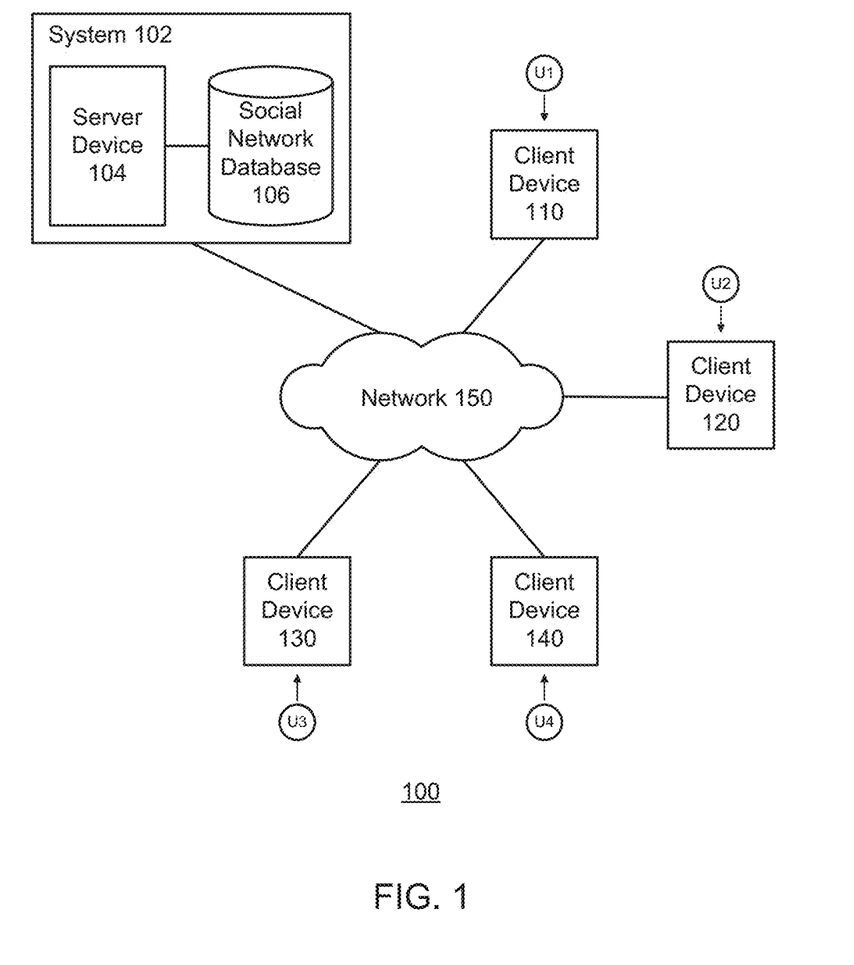
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may use their respective client devices 110, 120, 130, and 140 transmit media items such as images with each other.

In the various implementations described herein, processor of system 102 causes the elements described herein (e.g., high dynamic range images, changes to images, etc.) to be displayed in a user interface on one or more display screens.

While some implementations are described herein in the context of a social network system, these implementations may apply in contexts other than a social network. For example, implementations may apply locally for an individual user. For example, system 102 may perform the implementations described herein on a stand-alone computer, tablet computer, smartphone, etc.

Figure 2:
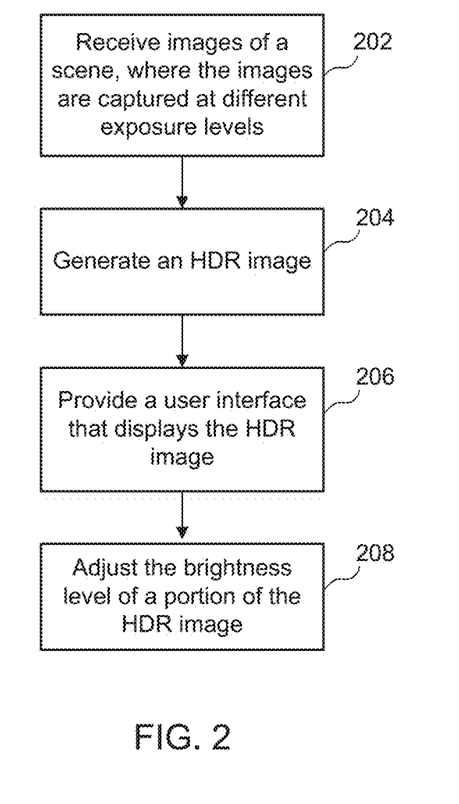
FIG. 2 illustrates an example simplified flow diagram for providing an interactive display of high dynamic range images, according to some implementations.

FIG. 2 illustrates an example simplified flow diagram for providing an interactive display of high dynamic range images, according to some implementations. Referring to both FIGS. 1 and 2, a method is initiated in block 202, where system 102 receives images of a scene, where the images are captured at different exposure levels. In some implementations, system 102 may receive images from a user when the user uploads the images to system 102. In some implementations, system 102 may enable a camera device (e.g., in a stand-alone camera, in a smart phone, in a computer tablet, etc.) of the user to automatically upload images to system 102 as the camera device captures photos.

Referring still to FIG. 2, in block 204, system 102 generates a high dynamic range (HDR) image of the scene based on brightness level information associated with each portion of the scene. In various implementations, system 102 combines the images having different brightness levels into an HDR image. More specifically, system 102 takes the brightness information for each image region of the images and determines which brightness best suits that region. System 102 then applies the best brightness levels to the regions in a single image. The HDR image may also be referred to as an HDR composition.

Figure 3:
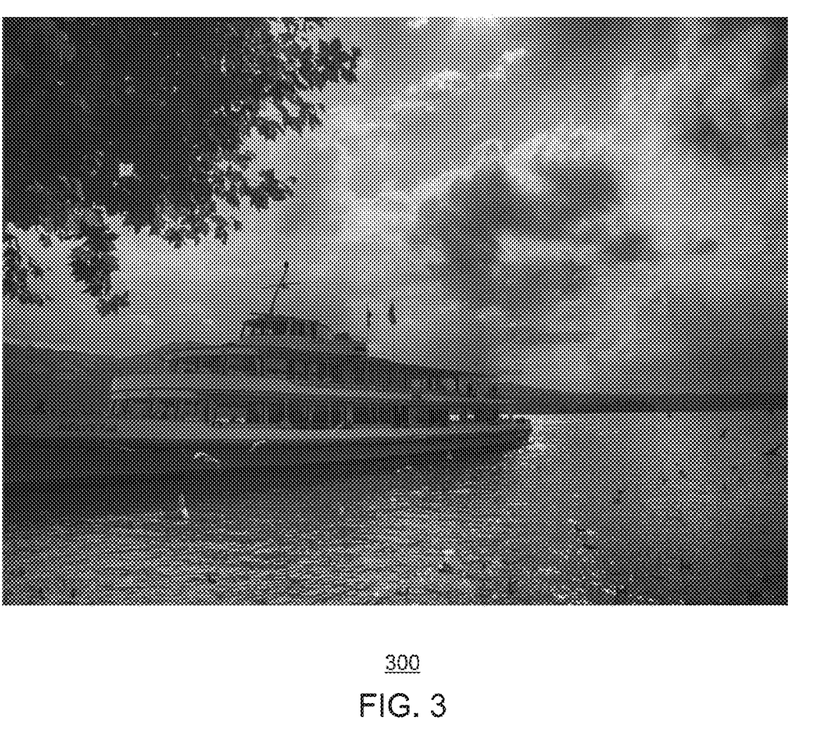
FIG. 3 shows an example high dynamic range (HDR) image, according to some implementations.

FIG. 3 shows an example high dynamic range image, according to some implementations. When showing images with a high dynamic range on a typical electronic display, there is a certain tradeoff between the natural appearance of the image and the actual dynamic range that can be displayed. For example, an image that is displayed with tone-mapping often has an unnatural look. Furthermore, when no tone mapping is performed, the dynamic range of the images that can be displayed is restricted by the dynamic range of the display on which it is displayed. As a result, some portions of the image will either be presented too bright and/or some parts will be presented too dark.

This is in contrast to the perception of a natural scene with the human eye, which often covers many orders of magnitude of brightness and the human eye just adopts its sensitivity to the area that is currently focused on.

See the example image below for an HDR image which looks unnatural because of the strongly compressed range of dynamic value. Such an image does have an artistic feel rather than a realist one (which in some cases is probably desired, but not always).

As indicated above, an image that is displayed with tone-mapping often has an unnatural look. In various implementations, instead of displaying a tone-mapped image, system 102 causes an interactive version of the HDR image to be displayed.

In various implementations, the interactive version of the HDR image is stored with full color information and information about a best brightness adjustment to use for each region of the high dynamic range image. This enables the portions of the HDR image to be further modified. For example, the brightness of a portion of the HDR image can be increased or decreased independently from other portions of the HDR image.

Furthermore, in various implementations, the images are captured with different focal settings such that both the brightness level information and focus settings are stored and can both be adjusted in real-time as the user is viewing the high dynamic range image. This will allow for viewing an image very much like viewing it in real life.

Referring again to FIG. 2, in block 206, system 102 provides a user interface that displays the HDR image. In various implementations, the user interface is a dynamic image viewer that displays changes in brightness to HDR images in-real time. System 102 causes the HDR image to be displayed in the user interface/dynamic image viewer, and the brightness of the image is adjusted according to the region of the HDR image which the user selects. As described in more detail below, the user can interact with the user interface to indicate which portion of the HDR image to change by simply looking at the HDR image, by clicking onto it, or by touching it.

In block 208, system 102 adjusts a brightness level of at least one portion of the HDR image based on user interaction with the user interface. In various implementations, the user interaction includes a user selection, where the user selection is based on a user gazing at at least one portion of the high dynamic range image. In various implementations, system 102 may use an eye-tracking algorithm that enables a device to track the direction of the gaze of the user. In various implementations, system 102 uses the user's gaze direction to dynamically select a portion of an image. As indicated herein, system 102 dynamically changes the brightness level of at least a portion of the HDR image based on the user's gaze (e.g., center of attention). Implementations for tracking the user's gaze are described in more detail below.

Such user interactions need not be explicit user interactions, and may be implicit. For example, in some implementations, the user may or may not be aware that the HDR image is being adjusted because of the change in the user's gaze. As described in more detail below, in some implementations, the user interactions may be more explicit where system 102 detects a user selection using a mouse or touchpad.

Figure 4:
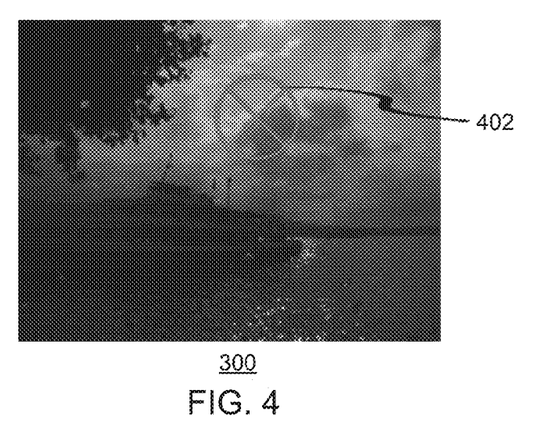
FIG. 4 shows a modified rendering of the HDR image, according to some implementations.
Figure 5:
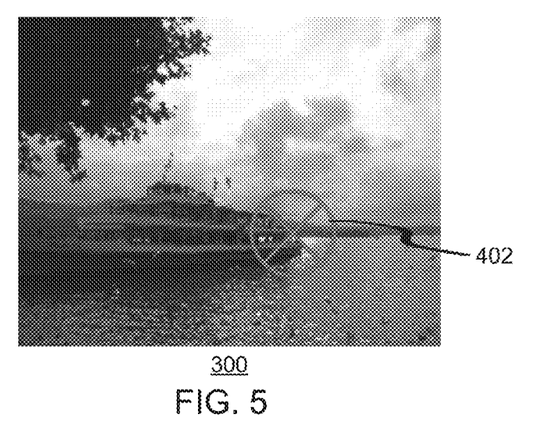
FIG. 5 shows another modified rendering of the HDR image, according to some implementations.
Figure 6:
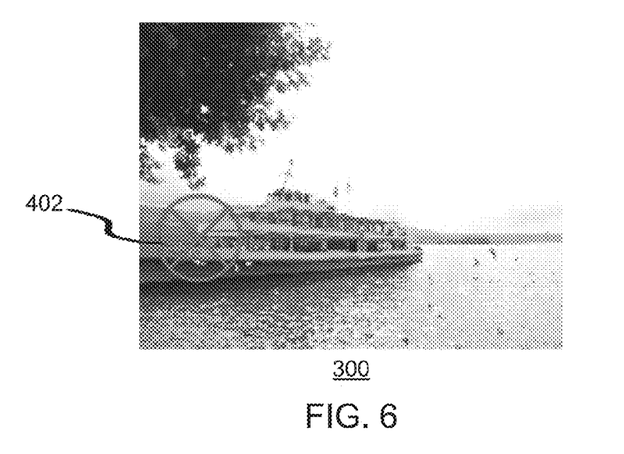
FIG. 6 shows another modified rendering of the HDR image, according to some implementations.

FIGS. 4, 5, and 6 show different renderings of HDR image 300 of FIG. 3, where the brightness setting is dynamically adjusted for different focus points. In other words, the same HDR image 300 adjusts dynamically as the focus of the user moves from one region of HDR image 300 to another image.

In various implementations, system 102 performs the adjusting in real-time as the user interacts with the user interface. In other words, as the user interacts with the user interface (e.g., moving the user's gaze around HDR image 300, etc.), system 102 dynamically adjusts image 300 and immediately displays the changes to the user in real-time. For example, as described in more detail below in connection with FIGS. 4, 5, and 6, system 102 causes the brightness in particular regions HDR image 300 to change based on user's gaze moving from one region to another.

FIG. 4 shows a modified rendering of HDR image 300 of FIG. 3, according to some implementations. As shown, a focus point 402 (shown as a circle containing an "X") indicates user interaction with the user interface. In this example implementation, the user interaction is the user gazing at a portion of the HDR image. In other words, focus point 402 indicates what portion of the HDR image is getting the user's attention. In this example, the user is gazing at the clouds where focus point 402 is positioned.

For clarification, focus point 402 follows the gaze of the user. In various implementations, focus point 402 is not visible to the user but is shown in the figures for ease of illustration.

As shown, system 102 has modified HDR image 300 such that it looks natural, yet has optimized brightness settings (or exposure setting) where the user is focusing (e.g., in the clouds where focus point 402 is positioned), but much less other areas (e.g., in the foreground). As a result, HDR image 300 of FIG. 4 shows much detail in the sky.

In various implementations, the size of the region may vary, depending on the specific implementation. For example, the region may be a predetermined radius, a predetermined number of pixels, etc. Furthermore, the region may have a predetermined shape (e.g., circular, oval, square, etc.).

In some implementations, system 102 adjusts the region that the user is gazing such that the brightness setting (or exposure setting) is adjusted, and the other regions remain the same. In some implementations, system 102 adjusts more than one region (e.g., all regions) but some more than others. For example, system 102 may adjust the brightness setting for the region that the user is gazing at to a higher degree, and may adjust the brightness setting for the other regions to a lesser degree.

In various implementations, system 102 may utilize a variety of gaze tracking algorithms and devices to determine the gaze of a given user. For example, in some implementations, an eye tracking device may be worn by the user (e.g., be positioned in the head area of the user, relatively close to an eye of the user, etc.). In some implementations, a camera or eye tracking device located on the user's device may detect eye movement of the user. Such eye tracking devices may use any suitable eye tracking technologies, including any suitable eye-tracking hardware components and algorithms, to measure eye positions and eye movement. Eye tracking device may use any suitable eye tracking technologies to measure the gaze of the user (e.g., the user's line of sight) or the motion of an eye relative to the head. For example, an eye tracking device may use a laser and laser technology to measure eye positions and eye movement relative to objects in the image, as the attention that the user places on particular objects changes.

In some implementations, system 102 may receive gaze information (e.g., parameter values associated with tracked parameters) directly from the eye tracking device or from any other one or more suitable storage locations. For example, in some implementations, the eye tracking device may send gaze information to system 102 as the user gazes at particular regions of the image. Such gaze information may also be stored locally at the user's client device (e.g., if used with a dedicated digital camera, or if used with a mobile phone or other electronic device that has an integrated digital camera, etc.).

In some implementations, system 102 may generate an attention map in order to track the gaze of the user, or gaze pattern of the user. System 102 may then identify regions and/or objects within the HDR image based on the gaze information. Such regions and/or objects may correspond to focus point 402.

FIG. 5 shows another modified rendering of HDR image 300 of FIG. 3, according to some implementations. As shown, focus point 402 indicates user interaction with the user interface, where the user interaction is the user gazing at a portion of the HDR image. In this example, the user is gazing at the rear of the boat where focus point 402 is positioned. In an example scenario, referring to FIGS. 4 and 5, the user's gaze may move from the sky to the rear of the boat. As such, focus point 402 moves from the sky to the rear of the boat.

As shown, system 102 has modified HDR image 300 such that it looks natural, yet has optimized brightness settings where the user is focusing, which is toward the rear of the boat. The brightness setting are optimized much less in the other areas. As a result, HDR image 300 of FIG. 5 shows much detail toward the rear of the boat.

FIG. 6 shows another modified rendering of HDR image 300 of FIG. 3, according to some implementations. As shown, focus point 402 indicates user interaction with the user interface, where the user interaction is the user gazing at a portion of the HDR image. In this example, the user is gazing at the front of the boat where focus point 402 is positioned. In an example scenario, referring to FIGS. 4, 5, and 6, the user's gaze may move from the sky to the rear of the boat and then to the front of the boat. As such, focus point 402 moves from the sky to the rear of the boat and then to the front of the boat.

As shown, system 102 has modified HDR image 300 such that it looks natural, yet has optimized brightness settings where the user is focusing, which is toward the front of the boat. The brightness settings are optimized much less in the other areas. As a result, HDR image 300 of FIG. 6 shows much detail toward the front of the boat.

As indicated above, in various implementations, the user interaction includes a user selection. For example, in some implementations, the user interaction includes a user selection, where the user selection is based on a user clicking on at least one portion of the high dynamic range image. For example, the user can select a portion of the image using a click of a mouse. Referring again to FIGS. 4, 5, and 6, the same regions shown to have the user's attention by gaze detection can be selected by the user manipulating a mouse.

In some implementations, the user interaction includes a user selection, where the user selection is based on a user touching at least one portion of the high dynamic range image. For example, the user can select a portion of the image using the user's finger or stylus (e.g., using a touchscreen). Referring again to FIGS. 4, 5, and 6, the same regions shown to have the user's attention by gaze detection can be selected by the user using a touchscreen.

Implementations described herein enable using a dynamic range that is larger than typical HDR images. However, as illustrated above, when adjusting the dynamic range automatically according to the user focus, the display can render the relevant part of the image as close as possible to what the user would have seen in real life where his or her eyes also typically adjust to only a small region.

Implementations described herein provide various benefits. For example, implementations described herein combine the advantages of natural-looking images with HDR options.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

Figure 7:
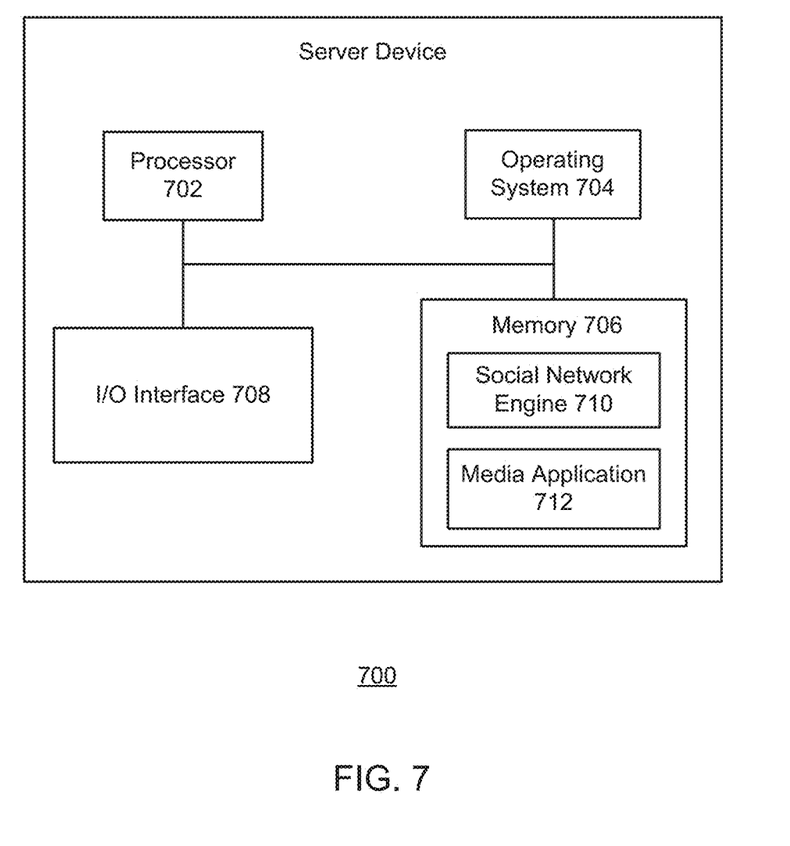
FIG. 7 illustrates a block diagram of an example server device, which may be used to implement the implementations described herein.

FIG. 7 illustrates a block diagram of an example server device 700, which may be used to implement the implementations described herein. For example, server device 700 may be used to implement server device 104 of FIG. 1, as well as to perform the method implementations described herein. In some implementations, server device 700 includes a processor 702, an operating system 704, a memory 706, and an input/output (I/O) interface 708. Server device 700 also includes a social network engine 710 and a media application 712, which may be stored in memory 706 or on any other suitable storage location or computer-readable medium. Media application 712 provides instructions that enable processor 702 to perform the functions described herein and other functions.

For ease of illustration, FIG. 7 shows one block for each of processor 702, operating system 704, memory 706, I/O interface 708, social network engine 710, and media application 712. These blocks 702, 704, 706, 708, 710, and 712 may represent multiple processors, operating systems, memories, I/O interfaces, social network engines, and media applications. In other implementations, server device 700 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network. For example, implementations may apply locally for an individual user.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions for execution by the processor. The software instructions can also be contained in, and provided as, an electronic signal, for example in the form of software as a service (SaaS) delivered from a server (e.g., a distributed system and/or a cloud computing system).

What is claimed is:

1. A method comprising:
   receiving a plurality of images of a scene, wherein the images are captured at different exposure levels;
   generating a high dynamic range image of the scene based on brightness level information associated with each portion of the scene;
   providing a user interface that displays the high dynamic range image;
   displaying on the user interface a focus point at a location based on eye gaze information; and
   adjusting a brightness level of at least one portion of the high dynamic range image relative to the focus point based on user interaction with the user interface, wherein the adjusting is performed in real-time as the user interacts with the user interface.

2. The method of claim 1, wherein the high dynamic range image is stored with full color information and information about a particular brightness adjustment to use for each region of the high dynamic range image.

3. The method of claim 1, wherein the user interaction comprises a user selection, wherein the user interaction includes the user gazing at the at least one portion of the high dynamic range image.

4. The method of claim 1, wherein the user interaction comprises a user selection, wherein the user selection is based on the user clicking on the at least one portion of the high dynamic range image.

5. The method of claim 1, wherein the user interaction comprises a user selection, wherein the user selection is based on the user touching the at least one portion of the high dynamic range image.

6. A method comprising:
receiving a plurality of images of a scene, wherein the images are captured at different exposure levels;
generating a high dynamic range image of the scene based on brightness level information associated with each portion of the scene;
providing a user interface that displays the high dynamic range image;
displaying on the user interface a focus point at a location based on eye gaze information; and
adjusting a brightness level of at least one portion of the high dynamic range image relative to the focus point based on user interaction with the user interface.

7. The method of claim 6, wherein the high dynamic range image is stored with full color information and information about a particular brightness adjustment to use for each region of the high dynamic range image.

8. The method of claim 6, wherein the user interaction comprises a user gazing at the at least one portion of the high dynamic range image.

9. The method of claim 6, wherein the user interaction comprises a user selection.

10. The method of claim 6, wherein the user interaction comprises a user selection, wherein the user selection is based on a user clicking on the at least one portion of the high dynamic range image.

11. The method of claim 6, wherein the user interaction comprises a user selection, wherein the user selection is based on a user touching the at least one portion of the high dynamic range image.

12. The method of claim 6, wherein the adjusting is performed in real-time as the user interacts with the user interface.

13. The method of claim 6, wherein the images are captured with different focal settings such that both the brightness level information and focus settings are adjusted in real time as the user is viewing the high dynamic range image.

14. A system comprising:
one or more processors; and
logic encoded in one or more tangible media for execution by the one or more processors and when executed operable to perform operations comprising:
receiving a plurality of images of a scene, wherein the images are captured at different exposure levels;
generating a high dynamic range image of the scene based on brightness level information associated with each portion of the scene;
providing a user interface that displays the high dynamic range image;
displaying on the user interface a focus point at a location based on eye gaze information; and
adjusting a brightness level of at least one portion of the high dynamic range image relative to the focus point based on user interaction with the user interface.

15. The system of claim 14, wherein the high dynamic range image is stored with full color information and information about a particular brightness adjustment to use for each region of the high dynamic range image.

16. The system of claim 14, wherein the user interaction comprises a user gazing at the at least one portion of the high dynamic range image.

17. The system of claim 14, wherein the user interaction comprises a user selection.

18. The system of claim 14, wherein the user interaction comprises a user selection, wherein the user selection is based on a user clicking on the at least one portion of the high dynamic range image.

19. The system of claim 14, wherein the user interaction comprises a user selection, wherein the user selection is based on a user touching the at least one portion of the high dynamic range image.

20. The system of claim 14, wherein the adjusting is performed in real-time as the user interacts with the user interface.

* * * * *